(12) United States Patent
Nakamura (10) Patent No.: US 7,425,782 B2
(45) Date of Patent: Sep. 16, 2008

(54) ELECTRIC CAR VOLTAGE CONVERSION DEVICE WITH FAILURE DETECTION

(75) Inventor: Makoto Nakamura, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 44 days.

(21) Appl. No.: 10/555,175

(22) PCT Filed: Feb. 6, 2004

(86) PCT No.: PCT/JP2004/007621

§ 371 (c)(1),
(2), (4) Date: Nov. 1, 2005

(87) PCT Pub. No.: WO2004/109899

PCT Pub. Date: Dec. 16, 2004

(65) Prior Publication Data

US 2006/0119333 A1   Jun. 8, 2006

(30) Foreign Application Priority Data

Jun. 4, 2003   (JP) .................... 2003-159966

(51) Int. Cl.
*H05K 7/14* (2006.01)
*B60K 1/00* (2006.01)
*H02P 1/00* (2006.01)

(52) U.S. Cl. .............. 307/149; 180/65.3; 180/65.8; 477/7

(58) Field of Classification Search ............. 363/16, 363/17, 18, 19, 20, 21.01, 21.02, 21.03, 21.04, 363/21.05, 21.06, 21.07, 21.08, 21.09, 21.1, 363/21.11, 21.12, 21.13, 21.14, 21.15, 21.16, 363/21.17, 21.18, 41, 95; 307/149; 180/65.3, 180/65.8; 701/22; 477/7
See application file for complete search history.

(56) References Cited

U.S. PATENT DOCUMENTS

| | | | | |
|---|---|---|---|---|
| 5,017,800 | A * | 5/1991 | Divan | 307/66 |
| 6,775,115 | B2 * | 8/2004 | Sato | 361/23 |
| 6,909,950 | B2 * | 6/2005 | Shimizu | 701/36 |
| 2003/0163296 | A1 * | 8/2003 | Richards | 703/14 |

FOREIGN PATENT DOCUMENTS

| | | |
|---|---|---|
| JP | A 1-111218 | 4/1989 |
| JP | A 2-308935 | 12/1990 |
| JP | U 3-60877 | 6/1991 |
| JP | A 5-260610 | 10/1993 |
| JP | A 5-260731 | 10/1993 |
| JP | A 2001-275367 | 10/2001 |

* cited by examiner

*Primary Examiner*—Shawn Riley
(74) *Attorney, Agent, or Firm*—Oliff & Berridge, PLC (57) ABSTRACT

A voltage conversion device includes a forward direction conversion circuit for converting an input voltage from a DC power source into a desired output voltage by adjusting a duty ratio of semiconductor element switching. The device further includes a control section that controls the duty ratio according to at least a target output voltage and an output voltage so that the output voltage approaches the target output voltage. Based on an operational value of the control section, it is judged whether a failure has occurred. Thus, it is possible to judge whether a failure has occurred without constituting a dual system.

22 Claims, 10 Drawing Sheets

| vdccom | Δduty1 | Δduty2 | Δduty_pi |
|---|---|---|---|
| 250 | 8.0% | 10.9% | 19.9% |
| 300 | 6.7% | 7.4% | 15.1% |
| 350 | 5.7% | 5.4% | 12.1% |
| 400 | 5.0% | 4.1% | 10.1% |
| 450 | 4.4% | 3.2% | 8.6% |
| 500 | 4.0% | 2.6% | 7.6% |

ELECTRIC CAR VOLTAGE CONVERSION DEVICE WITH FAILURE DETECTION

BACKGROUND OF THE INVENTION

1. Field of the Invention

The present invention relates to a voltage conversion device, and more particularly to a voltage conversion device provided with a function of controlling a duty ratio by switching using a semiconductor element. Further, the present invention relates to an application to an electric car.

2. Description of the Related Art

A voltage conversion device is an electric power conversion device which converts an input voltage from a direct-current power source into a desired output voltage. Based on switching using a semiconductor element, stepping up or down of a voltage can be performed by changing a ratio of a consumption time of an input voltage and a consumption time of an output voltage. For example, in an electric car, an output voltage boosted by a direct-current chopper as a voltage conversion device is converted into an alternating current by an inverter, thereby driving an alternating-current motor.

Japanese Patent Application Laid-open No. 308935-1990 discloses a configuration which determines a breakdown in a step-up/down chopper circuit based on a failure of a boosted voltage. Further, Japanese Patent Application Laid-open No. Hei 2-260610 discloses a configuration which boosts a power supply voltage by duty control of a step-up chopper and converts the boosted voltage into an alternating current in an inverter so that a motor is operated with the converted current. Furthermore, Japanese Patent Application Laid-open No. 2001-275367 discloses a configuration which provides a limiter for a current command to avoid an excess current in a structure which performs PI control in a step-up chopper device to obtain the current command.

It is desirable that a voltage conversion device, which often forms a basic structure in an electric system, is capable of rapidly detecting any generated failure. However, a configuration in which a sensor or the like for detecting a failure is formed as a dual system has an inconvenience in terms of a cost. Moreover, in an electric car or the like, even if some of components fail to operate properly, the failed parts must be specified in detail in order to for traveling to continue.

The present invention advantageously provides a failure judging mechanism having a simple configuration.

Additionally, the present invention advantageously enables multi-level setting of a failure judgment criterion in accordance with an operating status of an apparatus.

SUMMARY OF THE INVENTION

A voltage conversion device of the present invention includes a forward direction conversion circuit which converts an input voltage from a direct-current power source into a desired output voltage by adjusting a duty ratio in repeated on/off switching of a semiconductor element. The voltage conversion device comprises a control section that controls the duty ratio based on at least a target output voltage and an output voltage in such a manner that the output voltage approaches the target output voltage, and a judging section that judges occurrence of a failure in the voltage conversion device based on an operation value controlled by the control section.

In the voltage conversion device, adjustment of the duty ratio, i.e., adjustment of an on time and an off time of the semiconductor element is performed to step up or step down a direct-current voltage. Further, control is executed with an output voltage being determined as a control quantity and the duty ratio being determined as an operation quantity, and a failure of a direct-current chopper is judged based on an operation value indicative of how much this duty ratio is operated. When judging a failure, because the operation value calculated for control is utilized, there is provided an advantage that the configuration is simple and easy to package or configure.

It is to be noted that the voltage conversion device can comprise a reactor which stores an electric energy. That is, the voltage conversion device can comprise a coil which stores an energy of a magnetic field or a capacitor which stores an energy of an electric field, and these members perform storage and discharge of the energy by switching. As a result, a large electric energy can be output at the time of discharge. Further, an electric energy or a voltage to be output can be rectified and stabilized.

Furthermore, the voltage conversion circuit may comprise a backward direction conversion circuit which regenerates electric power with respect to a direct-current power source by switching using a semiconductor element in addition to a forward direction conversion circuit. The forward direction conversion circuit and the backward direction conversion circuit themselves are known technologies, and they can be constituted by using a diode, a transistor, or the like. The forward direction conversion circuit may be a step-up circuit which steps up a voltage or may be a step-down circuit which steps down a voltage. The backward direction conversion circuit is a step-down circuit in the former case, and it is a step-up circuit in the latter case.

As means for controlling an output voltage, various types of feedback control can be used without distinction of analog control and digital control. For example, PI control or PID control may be employed. A target output voltage which is set in such control can be appropriately changed by, e.g., externally inputting a value. It is to be noted that, when judging a failure, a limit value from which a sudden change is eliminated by performing filtering processing, e.g., a time mean operation can be utilized in place of directly using an obtained control value.

Preferably, in the voltage conversion device according to the present invention, the judging section determines occurrence of a failure in the voltage conversion device when the operation value is greater than or equal to a predetermined upper limit value or less than or equal to a predetermined lower limit value. With this configuration, a failure can be judged by just comparing the operation value with the predetermined upper limit value or the predetermined lower limit value, thereby facilitating the operation. The predetermined upper limit value and the predetermined lower limit value can be theoretically or empirically determined. These upper limit value and lower limit value may be configured to be appropriately changed in accordance with a powering status of a load at an output destination.

Preferably, in the voltage conversion device according to the present invention, the predetermined upper limit value or the predetermined lower limit value in the judging section is set in accordance with a target output voltage. A duty ratio is determined mainly based on a ratio of an input voltage and the target output voltage. Therefore, it is preferable to set a predetermined value which is used to judge a failure with respect to the operation value in accordance with the target output voltage. Thus, an appropriate predetermined value is set in each target output voltage. As an example of setting the predetermined value, there is a method of preparing a table and determining the predetermined value on multiple stages (at least two stages) in accordance with each target output voltage, a method of calculating the predetermined value from each target output voltage based on an arithmetic expression, or the like.

Preferably, the voltage conversion device according to the present invention further comprises a backward direction conversion circuit which performs voltage conversion of electric power supplied from an output destination by adjustment of the duty ratio in repeated on/off switching of the semiconductor element and regenerates electric power with respect to the direct-current power source. In feedback control, the duty ratio concerning the semiconductor element of this backward direction conversion circuit can be also controlled.

Preferably, the voltage conversion device of the present invention comprises a duty failure judging section which compares the input voltage with the output voltage in a state where semiconductor switches of the forward direction conversion circuit and the backward direction conversion circuit are fixed in an off state and a load of the output destination is allowed to do powering when the judging section has determined occurrence of a failure, and determines a duty failure of the semiconductor element if both the voltages are equal to each other in an allowable range. Alternatively, preferably, the voltage conversion device of the present invention comprises a duty failure judging section which compares the input voltage with the output voltage in a state where a semiconductor switch of the forward direction conversion circuit is fixed in an off state while a semiconductor switch of the backward direction conversion circuit is fixed in an on state and a load of the output destination is allowed to do powering when the judging section has determined occurrence of a failure, and determines a duty failure of the semiconductor element if both the voltages are equal to each other in an allowable range.

With this configuration, it is possible to judge whether a part in which a failure is generated exists in a sensor system or in a semiconductor element such as a diode or a transistor. If a failure position can be judged in this manner, there is an advantage that an appropriate countermeasure according to a judgment result can be taken.

Preferably, the voltage conversion device according to the present invention comprises a duty failure judging section that judges a duty failure of the semiconductor element based on a change in the operation value when a switching frequency of the semiconductor element is varied in cases where the judging section determines occurrence of a failure.

Preferably, the voltage conversion device of the present invention comprises a current value acquiring section that acquires a value of a current to be input; and a power consumption value acquiring section that acquires a power consumption value in a load on an output side, the voltage conversion device comprising an input/output voltage judging section which compares electric power obtained based on the input voltage and the current or the output voltage and the current with power consumption to judge a failure in the input voltage or the output voltage in a state where the semiconductor switch of the forward direction conversion circuit is fixed in the off state and the semiconductor element switch of the backward direction conversion circuit is fixed in the on state when the duty failure judging section has determined that there is no duty failure.

Preferably, the voltage conversion device according to the present invention comprises an inverter which receives direct-current power output from the voltage conversion device and converts this power into alternating-current power, and an alternating-current motor which is driven by the alternating-current power output from the inverter. An electric car may be a hybrid type which is driven by an internal combustion engine as well as the alternating-current motor. In the electric car, a space in which the voltage conversion device and others are mounted is restricted, and there is a difficult demand of preferably continuing traveling even if a failure is generated. Therefore, mounting the voltage conversion device which does not constitute a dual system has a great significance, and a function of judging a position where a failure is produced is also important.

Preferably, in the electric car according to the present invention, when the duty failure judging section determines a duty failure, the voltage conversion device fixes switches of the semiconductor elements of the forward direction conversion circuit and the backward direction conversion circuit in an off state. As a result, a regenerative operation is prohibited. Therefore, it is possible to prevent an excess voltage caused due to a failure of the duty ratio from destroying a smoothing capacitor or the like. On the other hand, powering is enabled through a diode. As a result, even if a duty failure is found in the voltage conversion device of the electric car, electric power can be supplied from the direct-current power source to drive the car. In case of the electric car, at the time of deceleration or the like, a rotational energy of the motor can be absorbed by a brake or the like rather than regeneration in the voltage conversion device, and hence this action effectively functions.

Preferably, in an electric car according to the present invention, when the input/output voltage judging section determines a failure in an output voltage, the voltage conversion device fixes a semiconductor switch of the forward direction conversion circuit in an off state, and fixes a switch of the semiconductor element of the backward direction conversion circuit in an on state. By fixing in these switch states, stepping up, stepping down, and regeneration are not carried out, and, hence, control utilizing an output voltage need not be executed in a control section, thereby enabling continued driving of the electric car.

DETAILED DESCRIPTION OF THE PREFERRED EMBODIMENT

A preferred embodiment of the present invention will now be described hereinafter with reference to the accompanying drawings.

Figure 1:
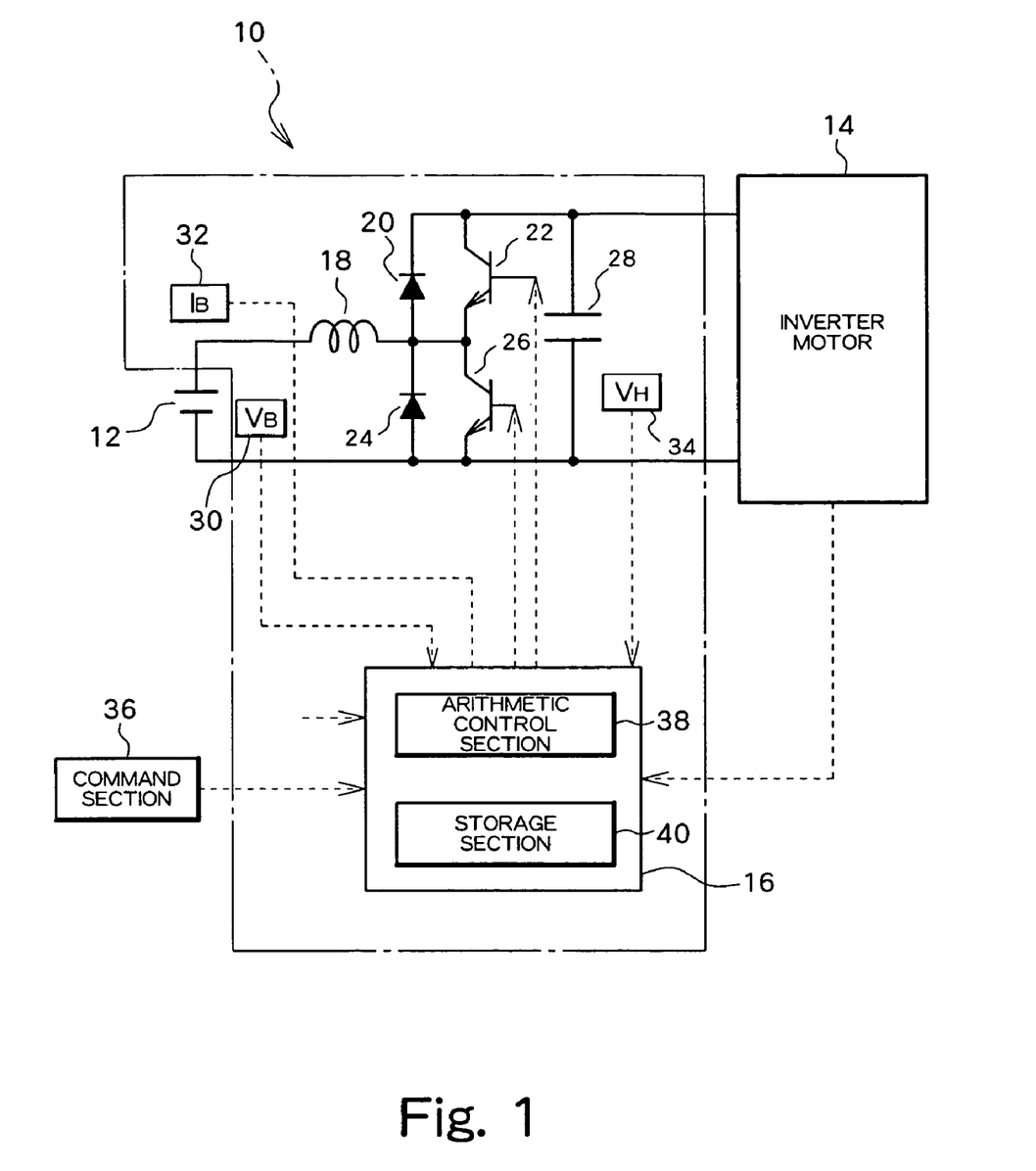
FIG. 1 is a schematic view showing a configuration of an embodiment of the present invention.
Figure 10:
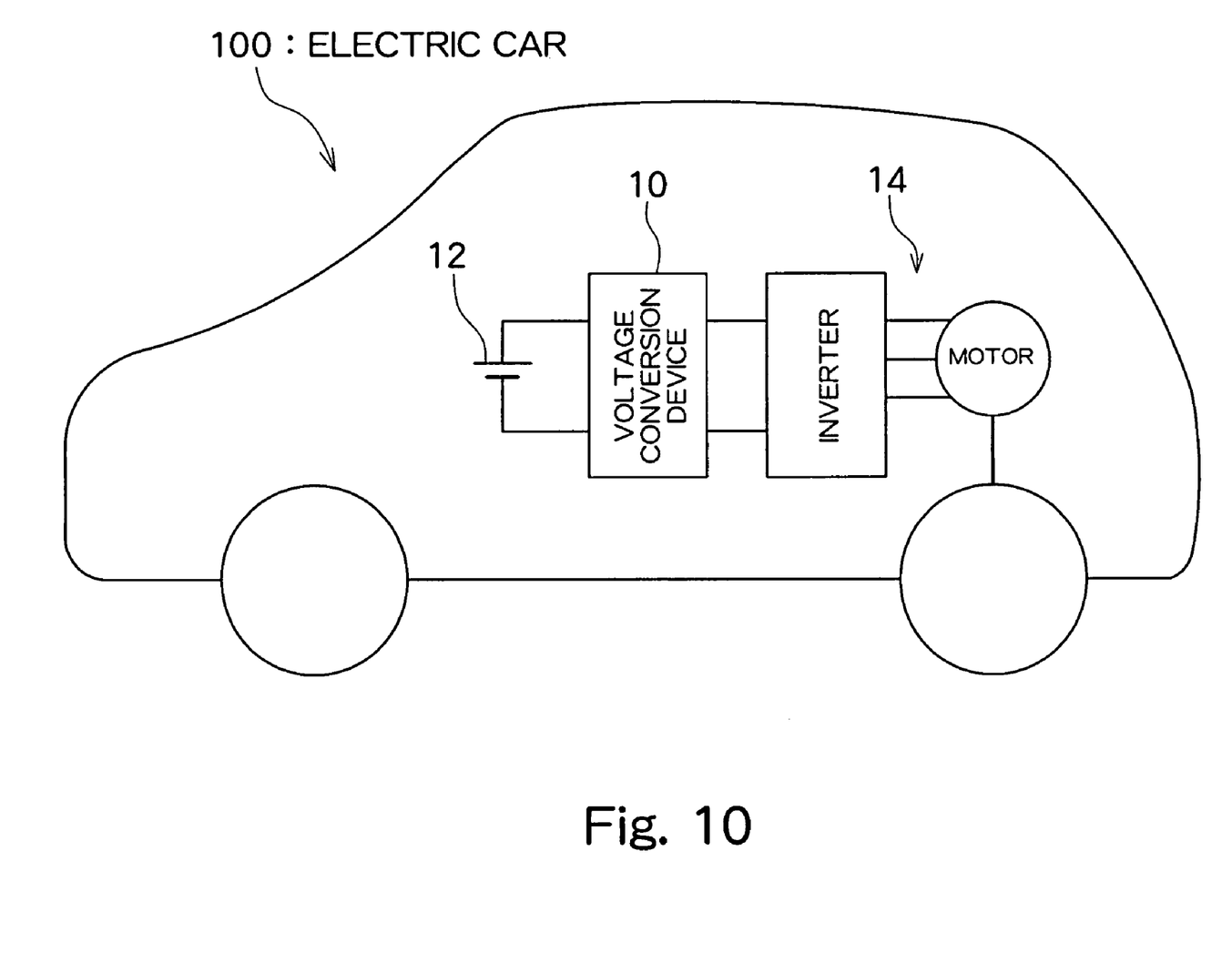
FIG. 10 is a view showing an example of an electric car according to the present invention.

FIG. 1 is a schematic view illustrating a configuration of a voltage conversion device and relevant devices according to this embodiment, and FIG. 10 is a view showing an outline of an electric car 100 in which such a voltage conversion device is installed. Such a voltage conversion device 10 includes a circuit connecting a direct-current power source 12 with an inverter motor 14 and a direct-current chopper device comprising a control section 16. A coil is connected with the circuit in series with the direct-current power source. Further, to the other end of the coil are connected an upper arm in which a diode 20 and a transistor 22 are connected in parallel and a lower arm in which a diode 24 and a transistor 26 are connected in parallel. The other end of the upper arm is output to one end of the inverter motor 14, and the other end of the lower arm is output to the other end of the inverter motor 14 and also connected with the direct-current power source 12. Furthermore, a capacitor 28 is connected in parallel with the inverter motor 14.

A voltage VB input from the direct-current power source 12 can be measured using a voltmeter 30, while an input current IB can be measured by an ammeter 34 and output voltage VH can be measured by a voltmeter 34. These measured voltages and current are supplied to the control section 16. Additionally, information of power consumption is supplied to the control section 16 from the inverter motor 14. Information with which the information of power consumption can be calculated, e.g., torque command information may be supplied in place of the information of power consumption. Further, target output power for control of output power executed in the control section 16 is input from a command section 36. The command section 36 occasionally directs optimum target output power in accordance with a traveling status of the electric car 100.

The control section 16 includes an arithmetic control section 38 and a storage section 40. The arithmetic control section 38 executes calculation in accordance with a preset program as well as processing of an input signal or an output signal. Specifically, the arithmetic control section 38 instructs switching with respect to the transistors 22 and 26. That is, the arithmetic control section 38 operates to control a duty ratio of on/off time to control switching so that the output voltage approaches the target output voltage. Furthermore, the arithmetic control section 38 performs control with an output voltage VH of a high-voltage chopper device being determined as a control quantity or arithmetic processing concerning a judgment on a failure in the circuit. The storage section 40 temporarily or permanently stores information required when the arithmetic control section 38 executes processing. For example, a threshold value which is used to judge a failure in the circuit is stored in this storage section 40.

Next, a function of the circuit will now be described. This circuit comprises a step-up circuit as a forward direction conversion circuit which supplies electric power from the direct-current power source 12 to the inverter motor 14 and a step-down circuit as a backward direction conversion circuit which regenerates electric power with respect to the direct-current power source 12. The step-up circuit operates by turning on and off the transistor 26 while setting the transistor 22 in an off state. That is, when the transistor 26 is in an on state, a current flowing form the direct-current power source 12 forms a loop which returns to the direct-current power source 12 through the coil 18 and the transistor 26. Meanwhile, magnetic energy is stored in the coil 18. Further, when the transistor 26 is turned off, the current flowing from the direct-current power source 12 forms a loop through which the current flows through the inverter motor 14 and returns to the direct-current power source 12 via the coil 18 and the diode 20. In this period, because the magnetic energy stored in the coil 18 as well as an electric energy from the direct-current power source 12 is supplied to the inverter motor 14, an output voltage fed to the inverter motor 14 is stepped up.

On the other hand, the step-down circuit operates by turning the transistor 22 on and off while maintaining the transistor 26 in an off state. That is, when the transistor 22 is in the on state, a current regenerated from the inverter motor 14 forms a loop by which the current flows through the transistor 22, the coil 18 and the direct-current power source 12 and returns to the inverter motor 14. Furthermore, when the transistor 22 is in the off state, the current forms a loop consisting of the coil 18, the direct-current power source 12 and the diode 24 so that the magnetic energy stored in the coil 18 is regenerated in the direct-current power source 12. In this backward direction conversion circuit, the voltage in the inverter motor 14 is stepped down to be regenerated in the direct-current power source 12 as apparent from the fact that a time in which the direct-current power source 12 receives the power is longer than a time in which the inverter motor 14 supplies the power. The operation of the voltage conversion device is carried out by appropriately controlling this powering operation and the regenerative operation.

A duty ratio will now be described. For a brief description, when the voltage conversion device 10 comprises only a step-up circuit, a duty ratio duty0 may be expressed as follows:

[Expression 1]

$$duty0 = ton/(ton+toff) \quad (1)$$

$$= VB/VH \quad (2)$$

In the above, ton is an on time of the transistor, and toff is an off time of the transistor. Expression (2) is a formula derived when the power supplied by the direct-current power source is equal to the power consumed on the output side on the assumption that the current flowing through the circuit is always fixed. As can be understood from Expressions (1) and (2), the output voltage can be set to a desired value by changing ton and toff to vary the duty ratio. In a definition of the duty ratio, it is possible to use a theoretical formula which does not perform approximation or has an increased accuracy of approximation. It is to be noted that, when the backward direction conversion circuit is included, performing extension based on the same concept can suffice.

Figure 2:
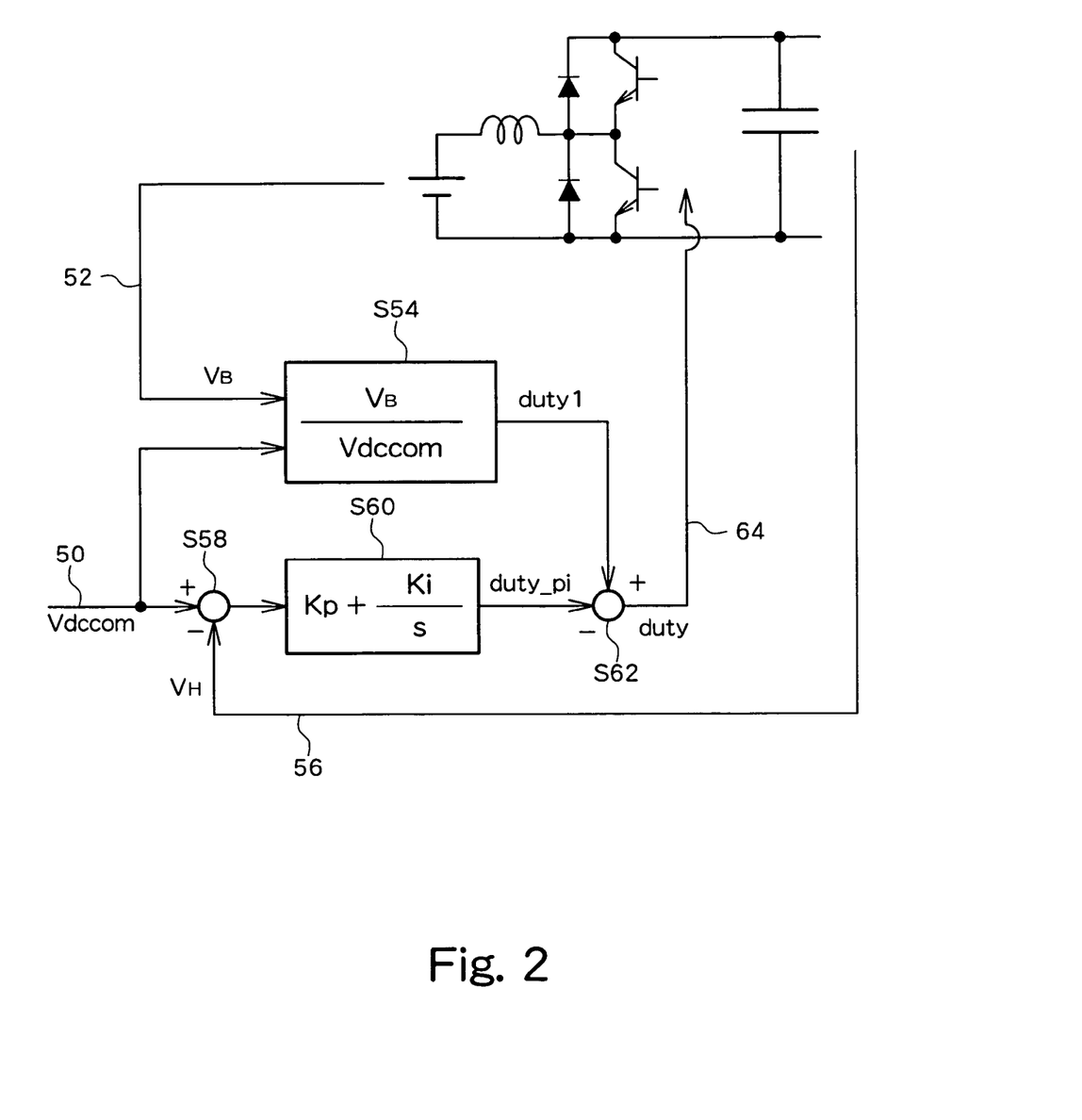
FIG. 2 is a block diagram illustrating an outline of control in a control section 16.

Control over the voltage conversion device 10 will now be described with reference to FIG. 2. FIG. 2 is a view illustrating a flow of control executed in the control section 16. First, based on a signal 50 of a target output voltage Vdccom input from the command section 36 and a signal 52 of an input voltage VB of the direct-current power source 12 input from the voltmeter 30, a duty ratio duty1 may be determined by using the following expression (S54):

[Expression 2]

$$duty1=VB/Vdccom \quad (3)$$

In this expression, Vdccom is substituted for VH in Expression (2). In other words, the duty ratio is set in accordance with a theoretical value in such a manner that the output voltage VH is determined as the target output voltage Vdccom.

However, in actual practice, the value of the output voltage VH differs from the target output voltage Vdccom due to, for example, limits of accuracy of the theoretical formula employed, or due to the operational accuracy of each device. Thus, a comparison calculation (S58) of the output voltage VH acquired by using a signal 56 input from the voltmeter 34 and the target output voltage Vdccom is performed to obtain a deviation E=(VH−Vdccom). Then, a calculation of PI control including a proportionality coefficient Kp and an integral coefficient Ki is carried out with respect to the deviation to acquire an operation value duty_pi. The operation value duty_pi can be formally represented using the following expression:

[Expression 3]

$$\text{duty\_}pi = Kp \cdot E + Ki S[E]dt \quad (4)$$

where S[E]dt indicates a time integral of E. However, the actual calculation is performed with respect to data digitized in terms of time in the control section 16. Moreover, a command signal 64 of switching is output to the transistors 22 and 26 based on a duty ratio duty=duty1−duty_pi obtained by correcting duty1 with duty_pi (S62).

Figure 3:
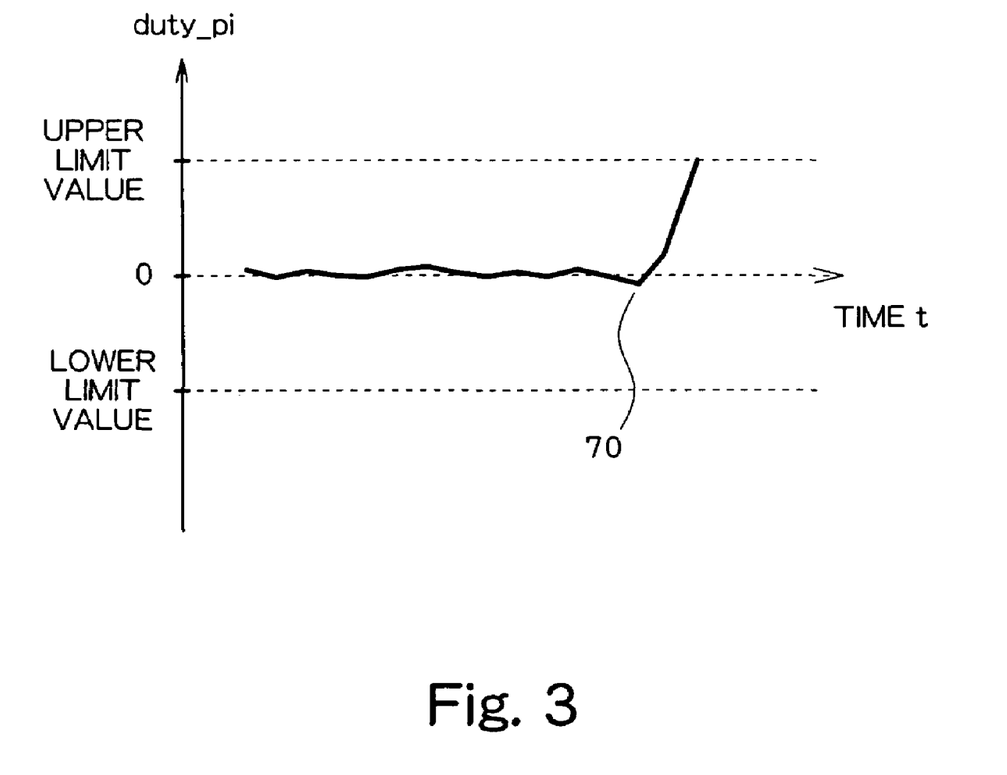
FIG. 3 is a view showing an example of changes in an operation value over time.

FIG. 3 is a view showing an example of changes in the operation value duty_pi with time. Usually, the operation value duty_pi is small (as compared with duty1), and varies little by little in the vicinity of 0. In this example, however, a failure occurs at a point of a clock time 70, and the operation value duty_pi thereby suddenly increases in a positive direction. When a failure is generated in this manner, the operation value duty_pi is affected. Thus, it is effective to set an upper limit value and a lower limit value which are used to judge occurrence of a failure with respect to the operation value, and judge occurrence of a failure when the operation value is out of a range of these values.

The setting of the upper limit value and the lower limit value will next be described. In the following description, consideration will be given as to three failures which can cause an abnormal operation value, i.e., failure in the input voltage VB due to a failure in a sensor, failure in the output voltage VH due to a failure in the sensor, and duty failure due to a failure of a semiconductor element such as a diode or a transistor.

First, it is assumed that the input voltage VB becomes VB+ΔVB due to a failure. In this case, assuming that a deviation from essentially expected duty1 is Δduty1, the following expression can be obtained:

[Expression 4]

$$\Delta duty1 = (VB + \Delta VB)/Vdccom - VB/Vdccom \quad (5)$$

$$= \Delta VB/Vdccom \quad (6)$$

Here, Δduty1 varies depending on a value of the target output voltage Vdccom. Therefore, when judging a failure provided that ΔVB has a given value, it is sufficient to set a threshold value for the Δduty1 failure judgment in accordance with the target output voltage Vdccom.

The impact of a failure in the output voltage VH will now be considered. An example case in which the output voltage becomes Vdccom−ΔVH will be considered. PI control functions to approximate a duty ratio when an output voltage is VH to a duty ratio when the output voltage is the target output voltage Vdccom. Therefore, deviation of the operation value may be approximated by the following expression:

[Expression 5]

$$\Delta duty2 = VB/(Vdccom - \Delta VH) - VB/Vdccom \quad (7)$$

Figure 4:
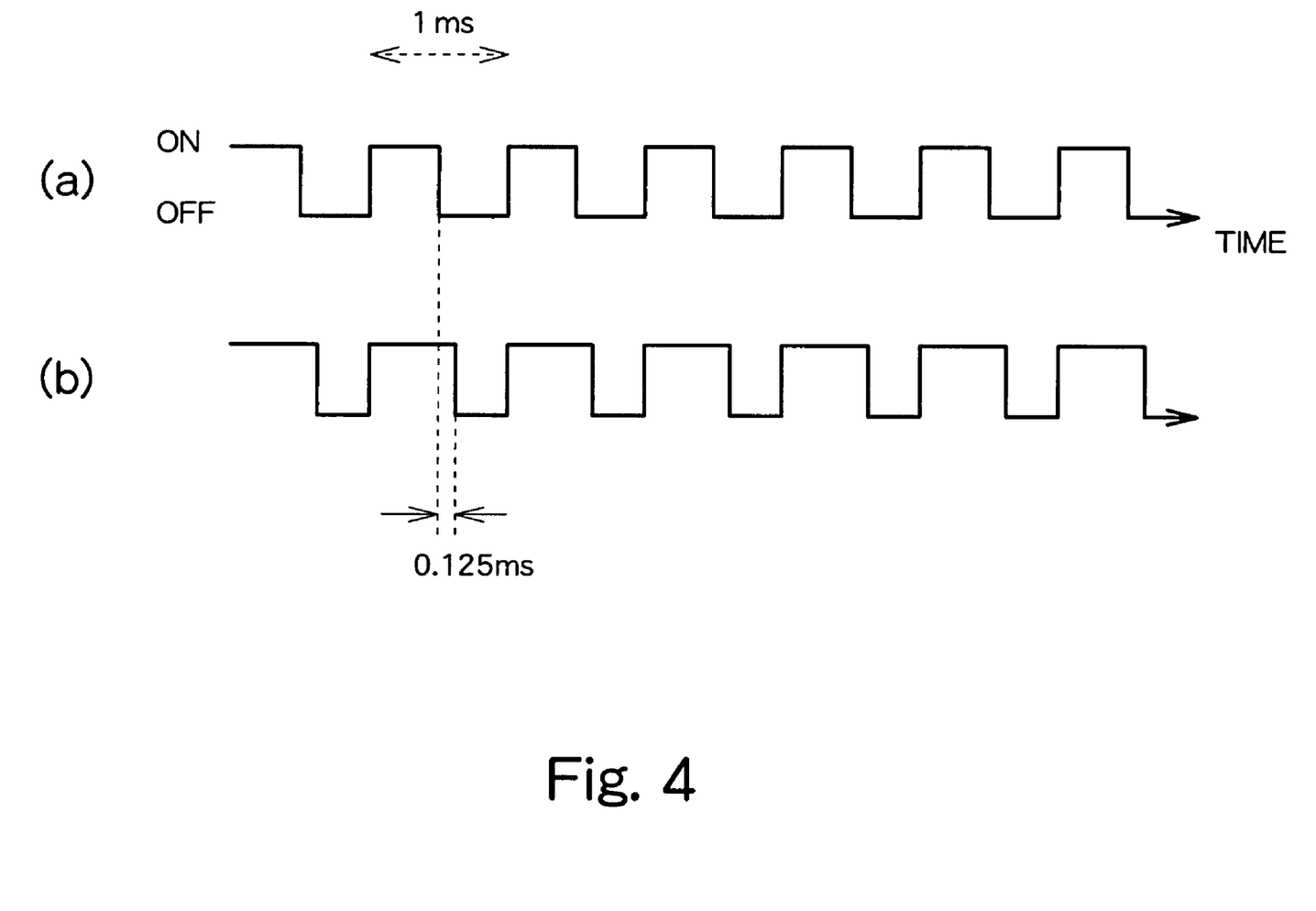
FIG. 4 is a view showing an example of on/off switching.

Further, Δduty3 caused due to a switching failure will be considered with reference to FIG. 4. FIG. 4 is a time chart showing a state of switching, in which the horizontal axis represents time while the vertical axis represents switching on and off values. In this figure, (a) on the upper side shows switching in a normal state, and (b) on the lower side shows switching when a failure has occurred. In (a), one cycle is 1 ms, ton and toff both correspond to 0.5 ms. Therefore, a carrier frequency fcarry=1/(ton+toff) is 1 kHz, and a duty ratio is 0.5 based on Expression (1). On the contrary, a time period of 0.125 ms is required in switching from on to off due to a failure, and a duty failure causing a duty ratio of 0.625 is produced. That is, assuming that an on time aberration caused due to a failure is ΔT with respect to a switching command, a difference between a proper value and a duty ratio can be represented by the following expression:

[Expression 6]

$$\Delta duty3 = (ton + \Delta T)/T - ton/T \quad (8)$$

$$= \Delta T/T \quad (9)$$

$$= \Delta T \cdot fcarry \quad (10)$$

In the above-described theoretical formulas (6), (7) and (10), when determining a threshold value for a judgment of a failure, ΔVB, ΔVH and ΔT are usually set based on component tolerances. Furthermore, the threshold value for a judgment is determined as follows so that these component tolerances are accepted as a whole.

[Expression 7]

$$\Delta duty_{13}pi = \Delta duty1 + \Delta duty2 + \Delta duty3 \quad (11)$$

Figure 5:
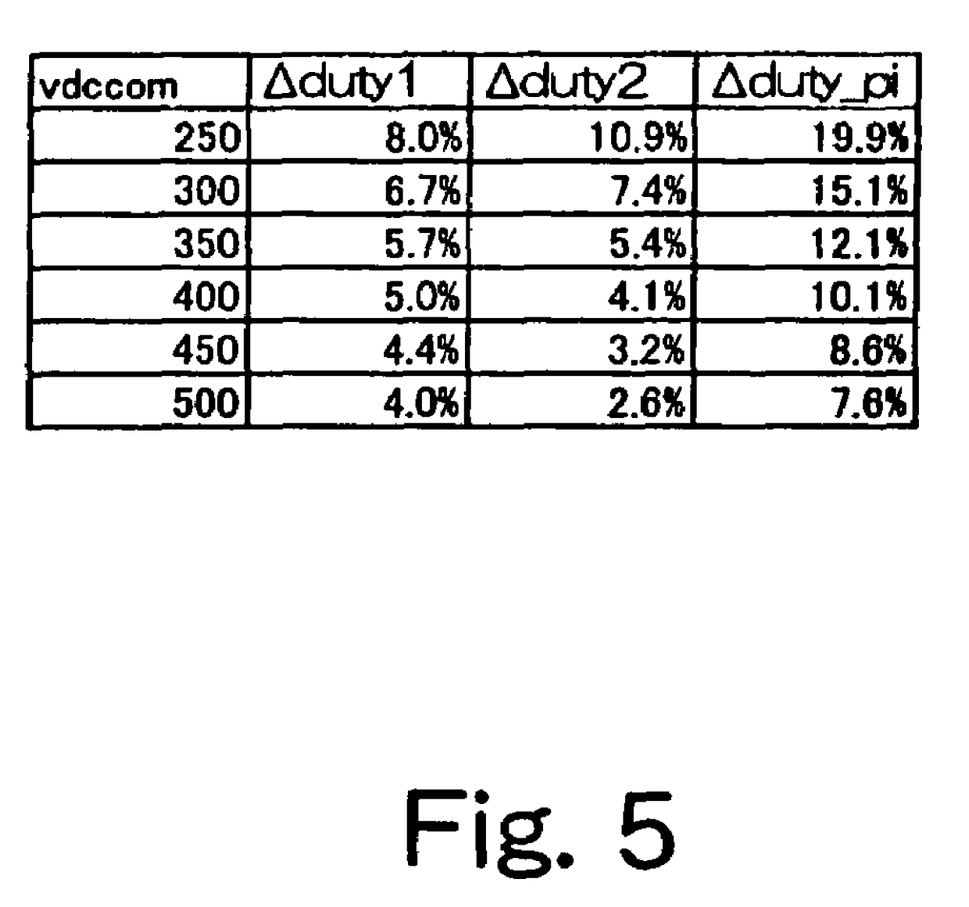
FIG. 5 is a table showing an example of a threshold value in each target output voltage.

FIG. 5 shows Δduty_pi in percentage when a value of Vdccom is changed from 250 V to 500 V. Respective items are an effect of ΔVB, an effect of ΔVH and a threshold value considering all effects. As values, VB=200 V, ΔVB=20V, ΔVH=30 V, and ΔT·fcarry=0.01 (1%) are used, for example. For instance, in case of Vdccom=250 V, an effect of Δduty1 is 8.0%, an effect of Δduty2 is 10.9% and an effect of Δduty3 is 1.0%, and Δduty_pi becomes 19.9% as a whole.

Figure 6:
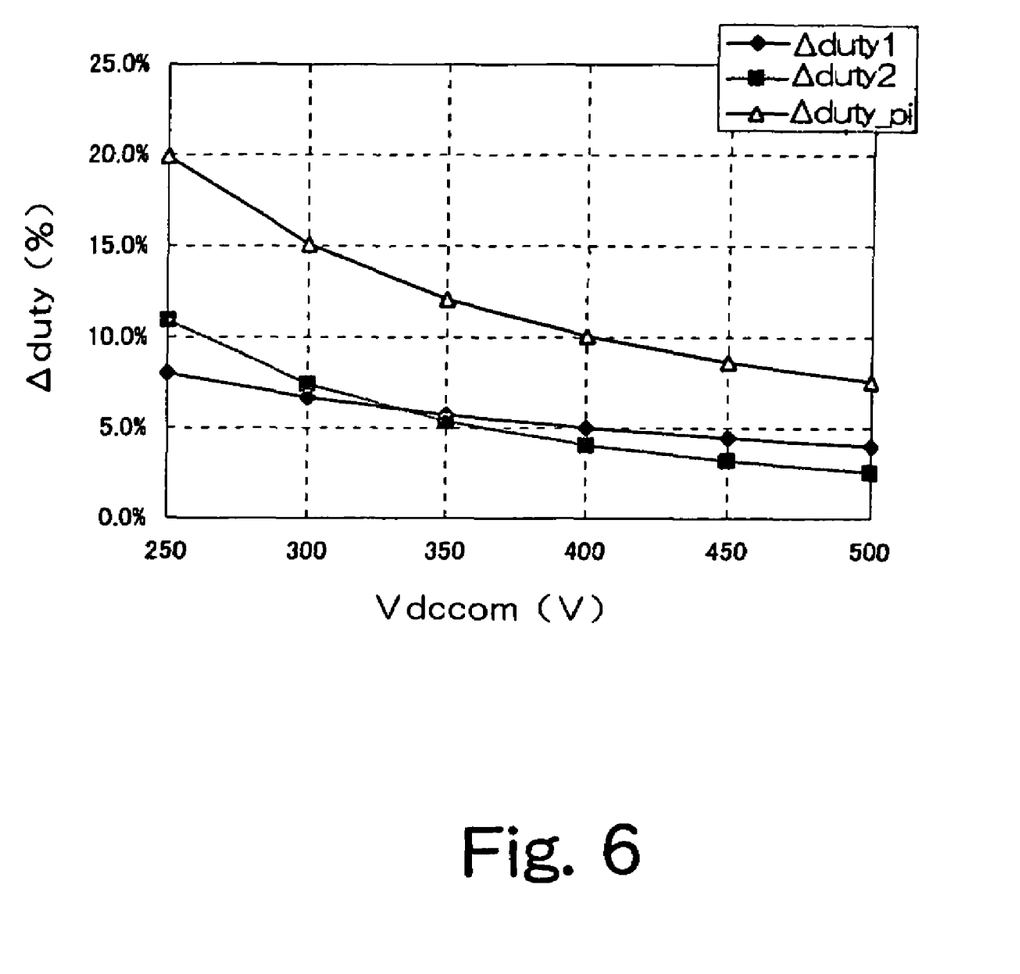
FIG. 6 is a graph showing a content of FIG. 5.

FIG. 6 is a graph showing the respective values in FIG. 5, in which a horizontal axis represents Vdccom and a vertical axis represents Δduty_pi. It is apparent from this graph that the threshold value becomes smaller value as Vdccom increases. For example, compared with a case when Vdccom=250 V, Δduty_pi when Vdccom=500 V is reduced to 40% or less.

In the control section 16, the content shown in FIG. 5 can be stored as a table in the storage section 40. Moreover, all theoretical formulae can be held in the storage section 40 so that an arithmetic operation of the threshold value Δduty_pi for the failure judgment can be performed as required. It is to be noted that the expressions with a high degree of approximation are used as the theoretical formulas in this example, but any other expressions can be used. Additionally, when obtaining a threshold value, the calculation may be based on formulas other than Expression (11). For example, it is easy to multiply Expression (11) by a constant while considering a probability that three elements redundantly occur. Further, when a, sign of Δduty_pi is considered, the upper limit value and the lower limit value for the failure judgment may be determined by different methods.

Figure 7:
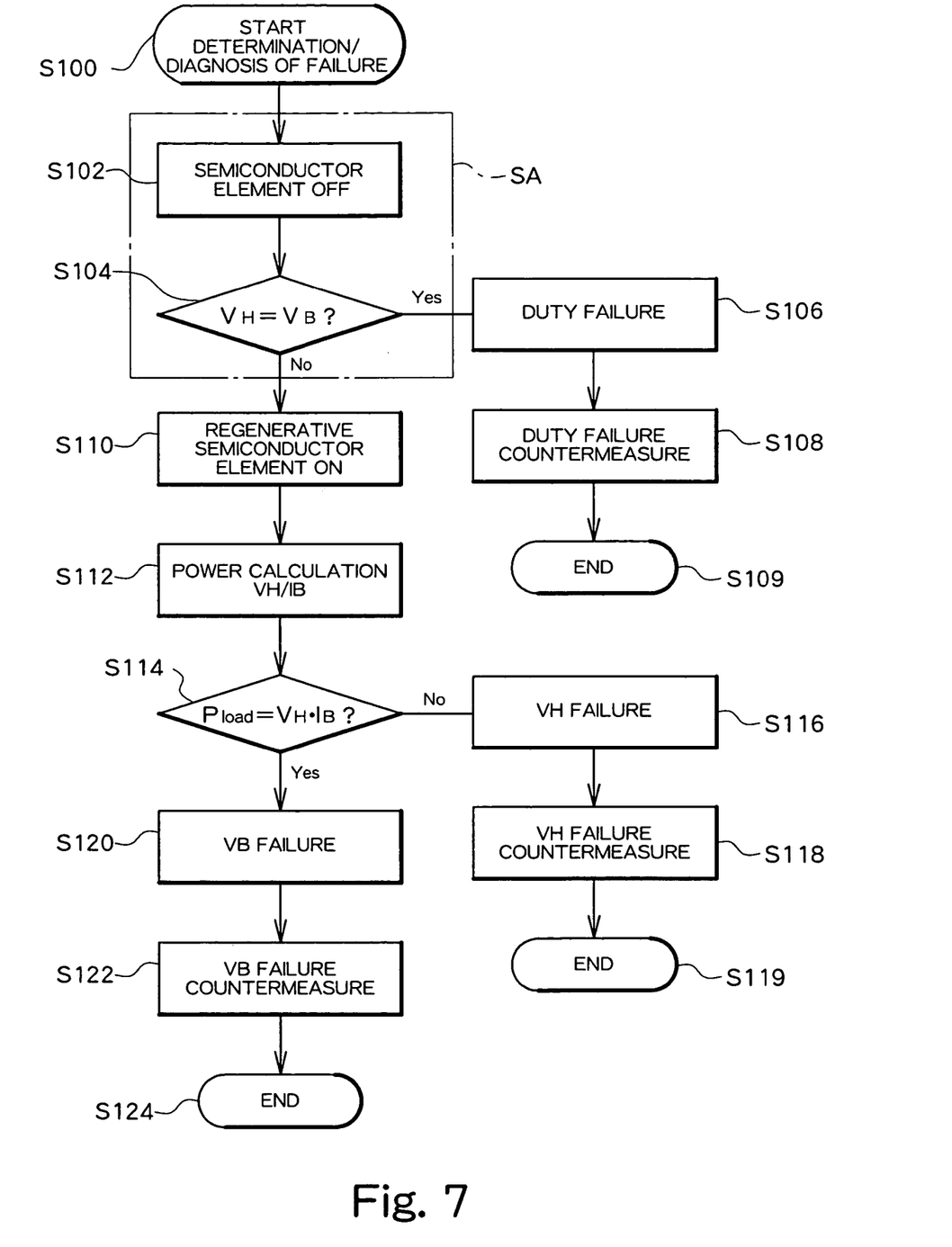
FIG. 7 is a flowchart showing a flow of a diagnosis and a measure with respect to a failure position.

A an example of processing for specifying a failure position and a subsequent measure when a failure is determined will next be described. FIG. 7 is a flowchart showing a flow of a diagnosis and a measure executed after a failure is determined by the judgment. At the start of a diagnosis (S100), the transistors 22 and 26 are fixed in the off state (S102). That is, they are fixed in a regeneration prohibited state and a powering enabled state. Furthermore, the input voltage VB measured by the voltmeter 30 is compared with the output voltage VH measured by the voltmeter 34 (S104). If the voltmeter 30 and the voltmeter 34 are both working properly, the two voltages should be equal to each other. Therefore, when the two voltages are equal, it is determined that a generated failure is caused due to a duty failure (S106), and a measure corresponding to the duty failure is taken (S108). It should be noted that, when judging whether both the voltages are equal to each other, a suitable tolerance for equality can be set in consideration of a resistance of the diode 20 or the like, a measurement error, and other factors. Such a measure preferably allows operation of the electric car 100 to be continuously performed. For example, a means for fixing switching of the transistor 22 in the off state and maintaining the regeneration prohibited state can be considered. As a result, it is possible to avoid destruction or damage of the capacitor 28 as results from an excess voltage. In this case, the transistor 26 is fixed in the off state, and powering is enabled.

On the other hand, when the input voltage VB and the output voltage VH are not equal to each other at the step S104, it is determined that a failure exists in the input voltage VB output by the voltmeter 30 or the output voltage VH output by the voltmeter 34. It is to be noted that, at the step S102, the judgment concerning the step S104 can be made even if the transistor 22 is turned on (the regeneration enabled state).

Then, the transistor 22 for regeneration is turned on (S110), and electric power VH·IB is calculated by using the current IB measured by the ammeter 32 (S112). Furthermore, a calculation result is compared with power consumption Pload concerning a load calculated based on power consumption information input from the inverter motor 14 (S114). When it is determined that the power consumption Pload and the current IB are reliable, it is next determined that a failure exists in the output voltage VH when both the values are not equal to each other (S116), and a measure for a VH failure is taken (S118). As this measure, maintaining the regeneration enabled state while fixing the transistor 22 in the on state and maintaining the powering enabled state while fixing the transistor 26 in the off state can be considered, for example.

On the other hand, when the two values are equal to each other, it is determined that a failure exists in the input voltage VB (S120), and a measure for a VB failure is taken (S122). Such a measure might include the known method of using an estimated value prepared in the storage section 40 or the like in place of the input voltage VB obtained by the signal 52 at S54 in FIG. 2, for example. It should also be noted that it is possible to calculate electric power VB·IB in place of the electric power VH·IB to make the same diagnosis at the step S112. Moreover, both the power VH·IB and the power VB·IB can be calculated to increase certainty of the diagnosis.

Figure 8:
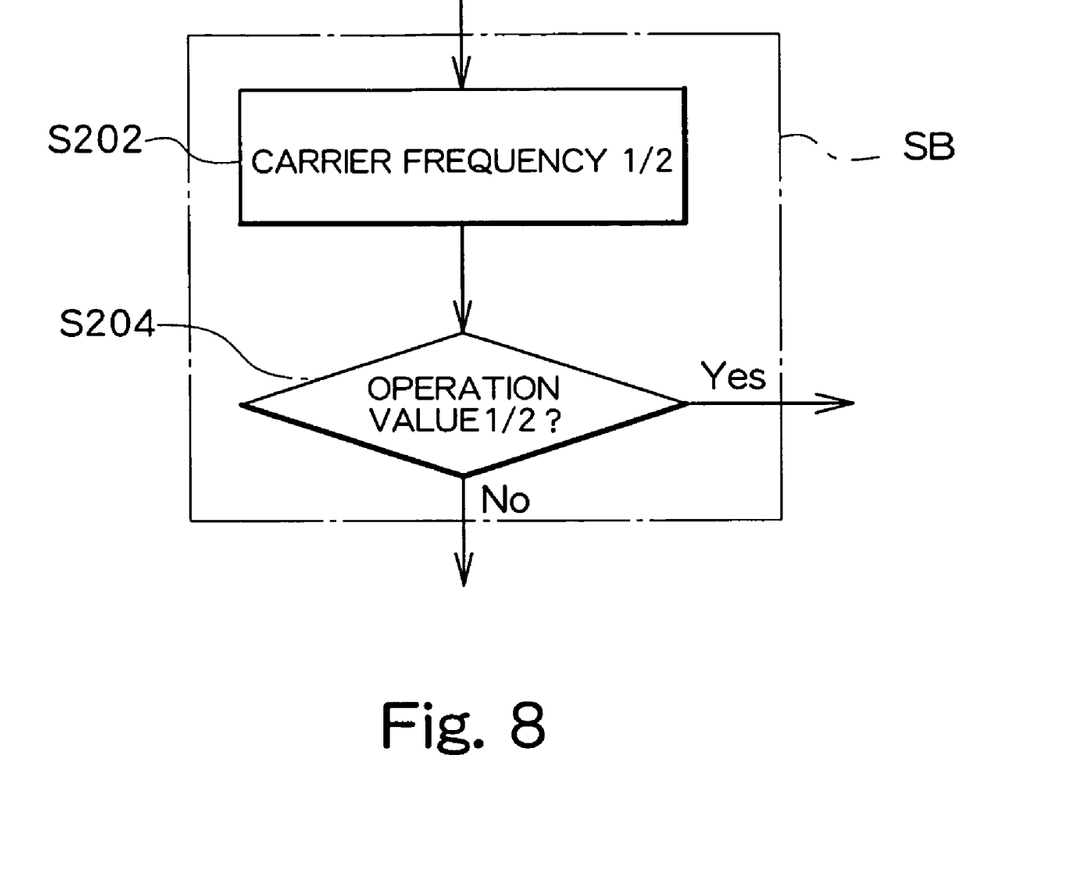
FIG. 8 is a flowchart showing alternative steps in FIG. 7.

Line SB in FIG. 8 shows alternative steps for the steps S102 and S104 concerning Line SA in FIG. 7, and a duty failure is likewise judged at these steps. That is, at a step S202, a carrier frequency of switching of the transistor is first reduced to ½. In such a case, it is checked whether the operation value duty_pi becomes ½ (within an allowable range) (S204).

Figure 9:
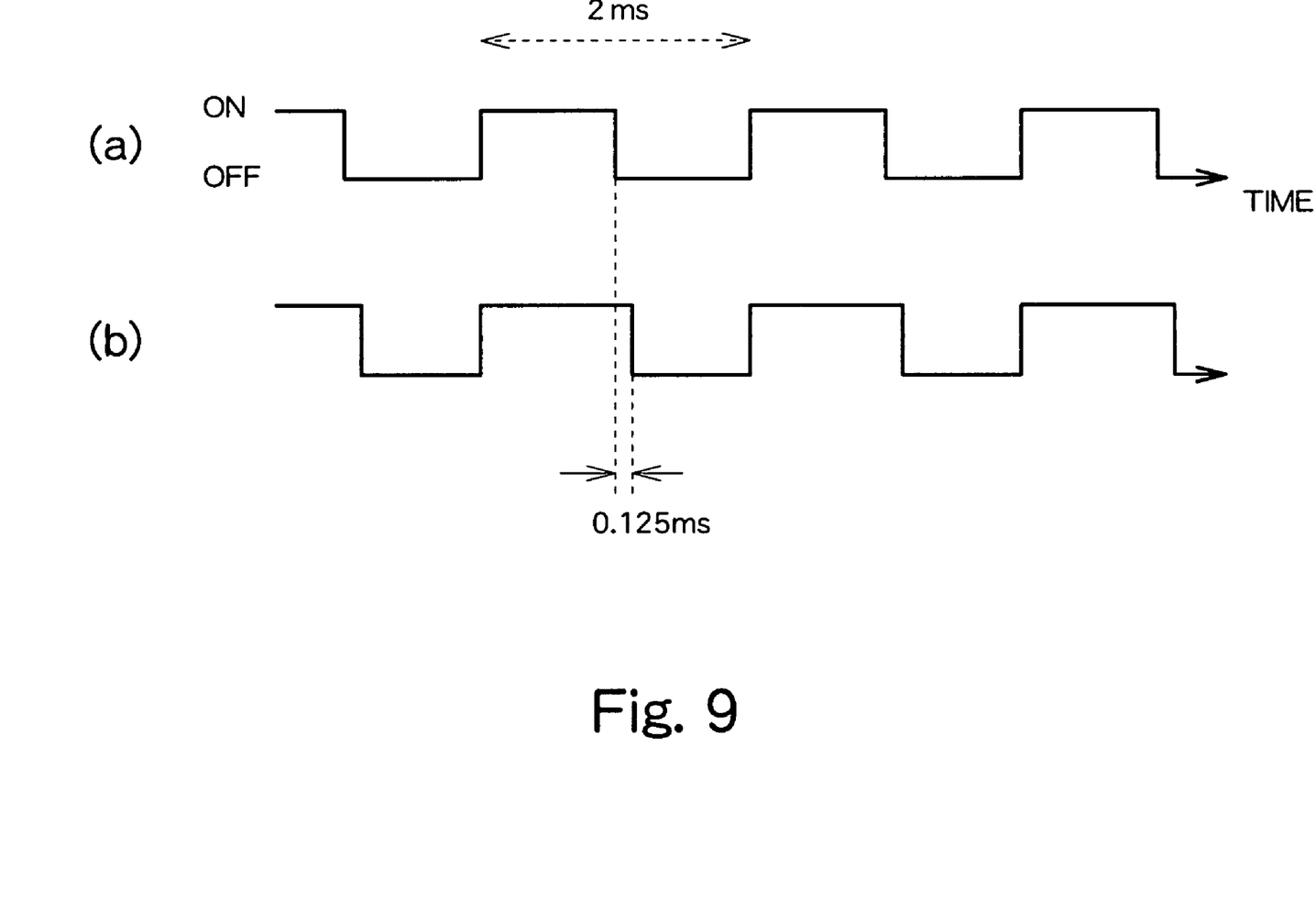
FIG. 9 is a view showing an example of on/off switching.

A state at this time will now be described with reference to FIG. 9. FIG. 9 is a time chart of switching of the transistor like FIG. 6. One cycle consisting of on/off is 2 ms, which is twice the a cycle in FIG. 6, and a carrier frequency fcarry which is an inverse number of this cycle are thus reduced to ½. In (a) on the upper side showing a normal state, the duty ratio is 0.5. On the other hand, in (b) on the lower side showing an abnormal state, ΔT is 0.125 ms like FIG. 6, and the duty ratio is 1.125/2=0.50625. Therefore, according to Expression (10), the operation value duty_pi=0.0625, which is one half the value of 0.125 shown in FIG. 6, is achieved.

Therefore, at a step S204, when the operation value is reduced to ½, it is judged that a duty failure has occurred (S106). On the other hand, when the operation value is not reduced to ½, it is considered that a failure has occurred at a position other than a switching position, and the transistor 22 is turned on while the transistor 26 is turned off at a step S110, to thereby continue a processing equivalent to that shown in FIG. 7.

It is to be noted that failure judgment can be separately made with respect to the transistor 22 and the transistor 26. That is, by separately changing a carrier frequency concerning the forward direction conversion circuit and a carrier frequency concerning the backward direction conversion circuit, a failure in the semiconductor element concerning each circuit can be judged.

What is claimed is:

1. A voltage conversion device including a forward direction conversion circuit which converts an input voltage from a direct-current power source into a desired output voltage by adjusting a duty ratio in repeated on/off switching of a semiconductor element, the voltage conversion device comprising:

a control section that control the duty ratio based on at least a target output voltage and an output voltage in such a manner that the output voltage approaches the target output voltage;

a judging section that judges occurrence of a failure in the voltage conversion device based on values of correction factors output from the control section that controls the duty ratio; and a backward direction conversion circuit which performs voltage conversion of electric power supplied from an output destination by adjusting the duty ratio in repeated on/off switching of the semiconductor element and regenerates the converted voltage with respect to the direct-current power source.

2. The voltage conversion device according to claim 1, comprising a duty failure judging section which, when the judging section determines that a failure has occurred:

compares the input voltage with the output voltage in a state wherein semiconductor switches of the forward direction conversion circuit and the backward direction conversion circuit are fixed in an off state and a load of the output destination is not prevented from performing a powering operation, and determines that a duty failure of the semiconductor element has occurred when the two voltages are sufficiently equal to each other.

3. The voltage conversion device according to claim 1, comprising a duty failure judging section which, when the judging section determines that a failure has occurred:

compares the input voltage with the output voltage in a state wherein a semiconductor switch of the forward direction conversion circuit is fixed in an off state while a semiconductor switch of the backward direction conversion circuit is fixed in an on state and a load of the output destination is not prevented from performing a powering operation, and determines that a duty failure of the semiconductor element has occurred when the two voltages are sufficiently equal to each other.

4. The voltage conversion device according to claim 1, comprising a duty failure judging section which, when the judging section determines that a failure has occurred:

judges a duty failure of the semiconductor element based on a change in the correction factors when a switching frequency of the semiconductor element is varied.

5. The voltage conversion device according to claim 2, comprising:

a current value acquiring section that acquires a value of a current to be input; and a power consumption value acquiring section that acquires a power consumption value in a load on an output destination, an input/output voltage judging section which compares electric power obtained based on the input voltage and the current or the output voltage and the current with power consumption to judge a failure in the input voltage or the output voltage in a state wherein the semiconductor switch of the forward direction conversion circuit is fixed in the off state and the semiconductor element switch of the backward direction conversion circuit is fixed in the on state when the duty failure judging section determines that no duty failure has occurred.

6. An electric car comprising:

the voltage conversion device according to claim 5;

an inverter which receives direct-current power output from the voltage conversion device, and converts the received power into alternating-current power; and an alternating-current motor driven by using the alternating-current power output from the inverter.

7. The electric car according to claim 6, wherein the voltage conversion device fixes semiconductor element switches of the forward direction conversion circuit and the backward direction conversion circuit in an off state when the duty failure judging section determines that a duty failure has occurred.

8. The electric car according to claim 6, wherein the voltage conversion device fixes a semiconductor switch of the forward direction conversion circuit in an off state and fixes a semiconductor element switch of the backward direction conversion circuit in an on state when the input/output voltage judging section determines that a failure in the output voltage has occurred.

9. The voltage conversion device according to claim 3, comprising:

a current value acquiring section that acquires a value of a current to be input; and a power consumption value acquiring section that acquires a power consumption value in a load on an output destination, an input/output voltage judging section which compares electric power obtained based on the input voltage and the current or the output voltage and the current with power consumption to judge a failure in the input voltage or the output voltage in a state wherein the semiconductor switch of the forward direction conversion circuit is fixed in the off state and the semiconductor element switch of the backward direction conversion circuit is fixed in the on state when the duty failure judging section determines that no duty failure has occurred.

10. The voltage conversion device according to claim 4, comprising:

a current value acquiring section that acquires a value of a current to be input; and a power consumption value acquiring section that acquires a power consumption value in a load on an output destination, an input/output voltage judging section which compares electric power obtained based on the input voltage and the current or the output voltage and the current with power consumption to judge a failure in the input voltage or the output voltage in a state wherein the semiconductor switch of the forward direction conversion circuit is fixed in the off state and the semiconductor element switch of the backward direction conversion circuit is fixed in the on state when the duty failure judging section determines that no duty failure has occurred.

11. An electric car comprising:

the voltage conversion device according to claim 9;

an inverter which receives direct-current power output from the voltage conversion device, and converts the received power into alternating-current power; and an alternating-current motor driven by using the alternating-current power output from the inverter.

12. The electric car according to claim 11, wherein the voltage conversion device fixes semiconductor element switches of the forward direction conversion circuit and the backward direction conversion circuit in an off state when the duty failure judging section determines that a duty failure has occurred.

13. The electric car according to claim 11, wherein the voltage conversion device fixes a semiconductor switch of the forward direction conversion circuit in an off state and fixes a semiconductor element switch of the backward direction conversion circuit in an on state when the input/output voltage judging section determines that a failure in the output voltage has occurred.

14. An electric car comprising:

the voltage conversion device according to claim 10;

an inverter which receives direct-current power output from the voltage conversion device, and converts the received power into alternating-current power; and an alternating-current motor driven by using the alternating-current power output from the inverter.

15. The electric car according to claim 14, wherein the voltage conversion device fixes semiconductor element switches of the forward direction conversion circuit and the backward direction conversion circuit in an off state when the duty failure judging section determines that a duty failure has occurred.

16. The electric car according to claim 14, wherein the voltage conversion device fixes a semiconductor switch of the forward direction conversion circuit in an off state and fixes a semiconductor element switch of the backward direction conversion circuit in an on state when the input/output voltage judging section determines that a failure in the output voltage has occurred.

17. The voltage conversion device according to claim 1, further comprising:

a section for determining a failure of at least one of voltmeters by performing switching so that voltages at both sides of the voltage conversion device are equal, and by comparing the voltages at both ends detected by the voltmeters, when the judging section determines that a failure has occurred.

18. The voltage conversion device according to claim 1, further comprising:

a section for determining a failure of a voltmeter at an output side of the voltage conversion device; and a section for enabling a continuous powering operation when a failure is detected at the output side of the voltmeter.

19. The voltage conversion device according to claim 1, wherein the voltage conversion device is mounted on an electric car for supplying drive power to the electric car; and the voltage conversion device comprises a section for determining a failure of voltmeters at both sides of the voltage conversion device in a state where drive of the electric car can be continuously performed.

20. The voltage conversion device according to claim 1, further comprising:

a section for determining a switching failure by varying a switching frequency of a semiconductor element when the judging section determines that a failure has occurred.

21. The voltage conversion device according to claim 1, further comprising:

a section for determining a failure of voltmeters at both ends of the voltage conversion device; and a section for performing diagnosis to determine whether the failure has occurred at an output side voltmeter based on the current flowing through the voltage conversion device and actual power consumption at the output side when a failure is detected in either one of the voltmeters.

22. The voltage conversion device according to claim 1, further comprising:

a section for determining a failure of an input side voltmeter of the voltage conversion device, wherein when a failure is detected at the input side voltmeter, the control section controls to continuously perform a powering operation by using an estimated value in place of the value measured by the voltmeter.

* * * * *